United States Patent
Nie et al.

(10) Patent No.: US 9,310,937 B2
(45) Date of Patent: Apr. 12, 2016

(54) TOUCH DRIVING CIRCUIT, OPTICAL IN CELL TOUCH PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Leisen Nie, Beijing (CN); Xiaojing Qi, Beijing (CN); Bo Wu, Beijing (CN); Haigang Qing, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 77 days.

(21) Appl. No.: 14/355,472

(22) PCT Filed: Nov. 13, 2013

(86) PCT No.: PCT/CN2013/087069
§ 371 (c)(1),
(2) Date: Apr. 30, 2014

(87) PCT Pub. No.: WO2014/205977
PCT Pub. Date: Dec. 31, 2014

(65) Prior Publication Data
US 2015/0301686 A1    Oct. 22, 2015

(30) Foreign Application Priority Data

Jun. 27, 2013 (CN) .......................... 2013 1 0263575

(51) Int. Cl.
*G06F 3/042* (2006.01)
*G06F 3/041* (2006.01)

(52) U.S. Cl.
CPC ............ *G06F 3/0421* (2013.01); *G06F 3/0412* (2013.01); *G06F 3/0416* (2013.01)

(58) Field of Classification Search
CPC .... G06F 3/0421; G06F 3/0412; G06F 3/0416
USPC ......................................................... 345/173
See application file for complete search history.

(56) References Cited

FOREIGN PATENT DOCUMENTS

| CN | 101957695 A | 1/2011 |
|---|---|---|
| CN | 101989152 A | 3/2011 |

(Continued)

OTHER PUBLICATIONS

Written Opinion of the International Searching Authority dated Feb. 21, 2014; PCT/CN2013/087069.

(Continued)

*Primary Examiner* — Sahlu Okebato
(74) *Attorney, Agent, or Firm* — Ladas & Parry LLP

(57) ABSTRACT

A touch driving circuit, an optical in cell touch panel and a display device, wherein the touch driving circuit includes a driving sub-module, a photosensitive sub-module, and a controlling sub-module. The photosensitive sub-module outputs a touch signal to the driving sub-module under controls of the switch signal terminal and the gate signal terminal; the driving sub-module outputs a touch sensing signal to the controlling sub-module under a control of the touch signal, and the touch sensing signal decreases as an intensity of light radiated on the photosensitive sub-module increases; and the controlling sub-module outputs the touch sensing signal to the touch signal reading terminal when the control signal terminal controls the controlling sub-module to be in a turn-on state, thus achieving the touch function.

15 Claims, 8 Drawing Sheets

(56) References Cited

FOREIGN PATENT DOCUMENTS

| CN | 102004581 A | 4/2011 |
| CN | 103135861 A | 6/2013 |
| CN | 103176676 A | 6/2013 |
| CN | 3353813 A | 10/2013 |

OTHER PUBLICATIONS

International Search Report mailed Mar. 13, 2014; PCT/CN2013/087069.

TOUCH DRIVING CIRCUIT, OPTICAL IN CELL TOUCH PANEL AND DISPLAY DEVICE

TECHNICAL FIELD

The present disclosure relates to a field of touch panel technique, and particularly to a touch driving circuit, an optical in cell touch panel and a display device.

BACKGROUND

With a rapid development of a display technique, a touch screen/panel has been popular in human's life. Currently, an In Cell touch panel has won favor with most of manufactures, because it can embed touch components into a display screen, reduce a thickness of an entire module and can also decrease a manufacture cost of the touch panel significantly. Therefore, a driving manner has also been a focus to be researched in the in cell touch panel.

A driving circuit in an existing optical touch panel comprises a plurality of stages of driving circuits for implementing a touch function. In particular, each stage of the driving circuit is as illustrated in FIG. 1 and comprises a photodiode PD, a capacitor Cst, a first transistor M1 and a second transistor M2; wherein a first terminal c1 of the capacitor Cst is connected with a constant voltage signal terminal RWS, a second terminal c2 of the capacitor Cst is connected with a first terminal p1 of the photodiode PD and a gate of the first transistor M1, respectively; a second terminal p2 of the photodiode PD is connected with a control signal terminal RST; a source of the first transistor M1 is connected with a high level signal terminal VDD, a drain of the first transistor M1 is connected with a source of the second transistor M2 and a read signal terminal Sensor, respectively; a gate of the second transistor M2 is connected with a reset signal terminal VB, and a drain of the second transistor M2 is connected with a low level signal terminal VSS.

In the driving circuit of the existing optical touch panel, if all of touch signal reading terminals of the respective stages of the driving circuits are connected to a same touch signal reading line collectively, a crosstalk can occur in signals outputted from the touch signal reading terminals of the different stages of the driving circuits, and in turn an accuracy of a detection of the touch signals on the touch panel will be affected. If the touch signal reading terminals of the respective stages of the driving circuits are provided with touch signal reading lines, respectively, a wiring area of the touch panel would increase undesirably.

SUMMARY

Embodiments of the present disclosure provide a touch driving circuit, an optical in cell touch panel and a display device, which can improve an accuracy of a detection of touch signals without increasing a wiring area for a touch panel.

The embodiments of the present disclosure provide a touch driving circuit comprising a photosensitive sub-module, a driving sub-module and a controlling sub-module, wherein, a first signal input terminal of the photosensitive sub-module is connected with a switch signal terminal, a second signal input terminal of the photosensitive sub-module is connected with a gate signal terminal, a signal output terminal of the photosensitive sub-module is connected with a first signal input terminal of the driving sub-module; the photosensitive sub-module outputs a touch signal to the driving sub-module under controls of the switch signal terminal and the gate signal terminal;

a second signal input terminal of the driving sub-module is connected with a reference signal terminal, a third signal input terminal of the driving sub-module is connected with a control signal terminal and a first signal input terminal of the controlling sub-module, respectively; a signal output terminal of the driving sub-module is connected with a second signal input terminal of the controlling sub-module; the driving sub-module outputs a touch sensing signal to the controlling sub-module under a control of the touch signal, and the touch sensing signal decreases as an intensity of light irradiated on the photosensitive sub-module increases;

a signal output terminal of the controlling sub-module is connected with a touch signal reading terminal; the controlling sub-module outputs the touch sensing signal to the touch signal reading terminal when the control signal terminal controls the controlling sub-module to be in a turn-on state.

The embodiments of the present disclosure further provide an optical in cell touch panel comprising the touch driving circuit according to the embodiments of the present disclosure.

The embodiments of the present disclosure further provide a display device comprising the optical in cell touch panel according to the embodiments of the present disclosure.

The embodiments of the present disclosure provide a touch driving circuit, an optical in cell touch panel and a display device, wherein the touch driving circuit comprises: a driving sub-module, a photosensitive sub-module and a controlling sub-module, wherein, a first signal input terminal of the photosensitive sub-module is connected with a switch signal terminal, a second signal input terminal of the photosensitive sub-module is connected with a gate signal terminal, and a signal output terminal of the photosensitive sub-module is connected with a first signal input terminal of the driving sub-module; a second signal input terminal of the driving sub-module is connected with a reference signal terminal, a third signal input terminal of the driving sub-module is connected with a control signal terminal and a first signal input terminal of the controlling sub-module, respectively; a signal output terminal of the driving sub-module is connected with a second signal input terminal of the controlling sub-module; and a signal output terminal of the controlling sub-module is connected with a touch signal reading terminal. The photosensitive sub-module outputs a touch signal to the driving sub-module under controls of the switch signal terminal and the gate signal terminal; the driving sub-module outputs a touch sensing signal to the controlling sub-module under a control of the touch signal, and the touch sensing signal decreases as an intensity of light radiated on the photosensitive sub-module increases; and the controlling sub-module outputs the touch sensing signal to the touch signal reading terminal when the control signal terminal controls the controlling sub-module to be in a turn-on state, so as to achieve the touch detection function. As compared with the driving circuit in the existing optical in cell touch panel, the touch driving circuit according to the embodiments of the present disclosure utilizes the controlling sub-module to control the driving sub-module so as to output the touch sensing signal to the touch signal reading terminal, in a case in which the touch signal reading terminals of the respective stages of the driving circuits are connected to a same touch signal reading line, a crosstalk can be prevented from occurring in the signals outputted from the touch signal reading terminals of the different stages of the driving circuits, which can improve the accuracy of the detection of touch signals without increasing the wiring area on the touch panel.

DETAILED DESCRIPTION

Detailed implementations of a touch driving circuit, an optical in cell touch panel and a display device according to the embodiments of the present disclosure will be described in detail below in connection with drawings.

Figure 1:
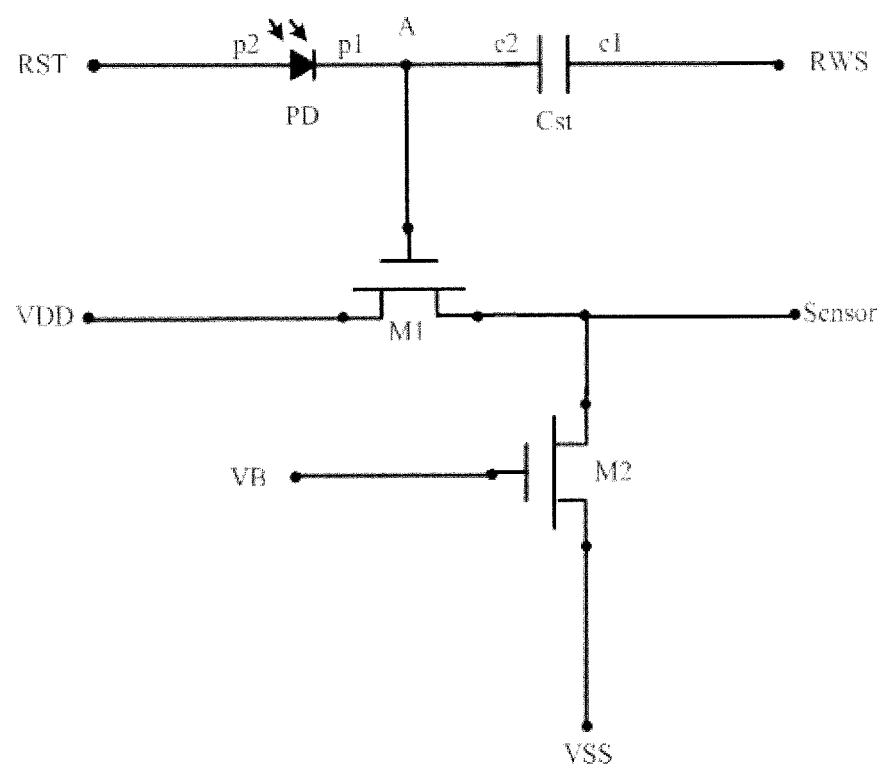
FIG. 1 is an exemplary view illustrating a structure of a driving circuit in an optical touch panel in the prior art.
Figure 2:
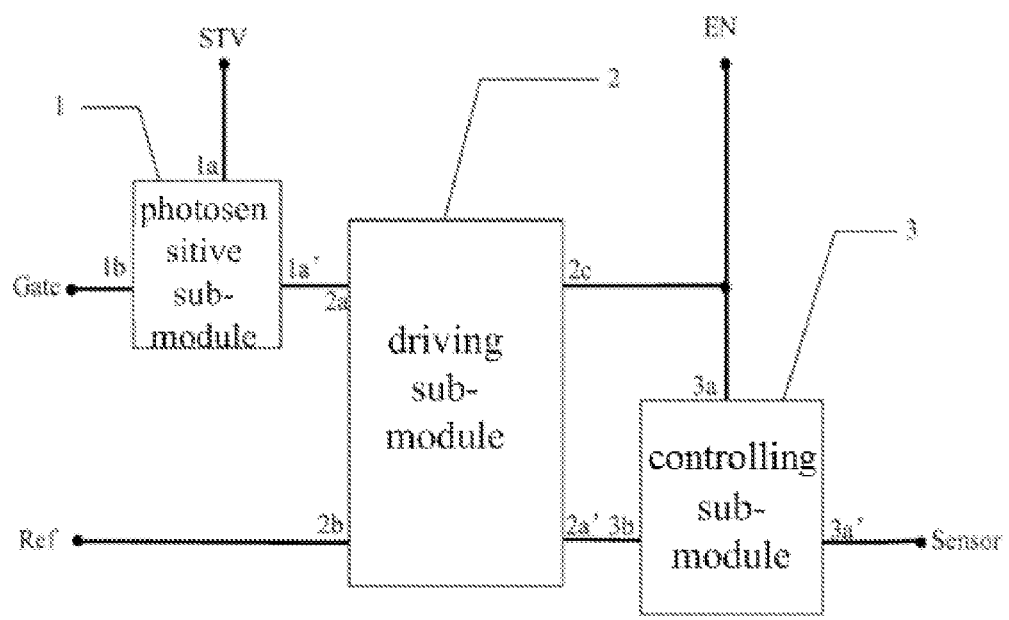
FIG. 2 is an exemplary view illustrating a structure of a touch driving circuit according to embodiments of the present disclosure.

The embodiments of the present disclosure provide a touch driving circuit, as illustrated in FIG. 2, which comprises a photosensitive sub-module 1, a driving sub-module 2 and a controlling sub-module 3, wherein, a first signal input terminal 1a of the photosensitive sub-module 1 is connected with a switch signal terminal STV, a second signal input terminal 1b of the photosensitive sub-module 1 is connected with a gate signal terminal Gate, a signal output terminal 1a' of the photosensitive sub-module 1 is connected with a first signal input terminal 2a of the driving sub-module 2; the photosensitive sub-module 1 outputs a touch signal to the driving sub-module 2 under controls of the switch signal terminal STV and the gate signal terminal Gate;

a second signal input terminal 2b of the driving sub-module 2 is connected with a reference signal terminal Ref, a third signal input terminal 2c of the driving sub-module 2 is connected with a control signal terminal EN and a first signal input terminal 3a of the controlling sub-module 3, respectively, a signal output terminal 2a' of the driving sub-module 2 is connected with a second signal input terminal 3b of the controlling sub-module 3; the driving sub-module 2 outputs a touch sensing signal to the controlling sub-module 3 under a control of the touch signal, and the touch sensing signal decreases as an intensity of light irradiated on the photosensitive sub-module 1 increases; and a signal output terminal 3a' of the controlling sub-module 3 is connected with a touch signal reading terminal Sensor; the controlling sub-module 3 outputs the touch sensing signal to the touch signal reading terminal Sensor when the control signal terminal EN controls the controlling sub-module 3 to be in a turn-on state.

As compared with the driving circuit in the existing optical in cell touch panel, the touch driving circuit according to the embodiments of the present disclosure utilizes the controlling sub-module to control the driving sub-module so as to output the touch sensing signal to the touch signal reading terminal, in a case in which the touch signal reading terminals of the respective stages of the driving circuits are connected to a same touch signal reading line, the crosstalk can be prevented from occurring in the signals outputted from the touch signal reading terminals of the different stages of the driving circuits, which can improve the accuracy of the detection of touch signals without increasing the wiring area on the touch panel.

In specific embodiments, as illustrated in FIG. 3a-FIG. 3d, the photosensitive sub-module 1 in the touch driving circuit according to the embodiments of the present disclosure can comprise a photosensitive transistor PD-TFT; wherein a gate of the photosensitive transistor PD-TFT is connected with the switch signal terminal STV, a source of the photosensitive transistor PD-TFT is connected with the gate signal terminal Gate, and a drain of the photosensitive transistor PD-TFT is connected with the first signal input terminal of the driving sub-module 2.

Figure 3A:
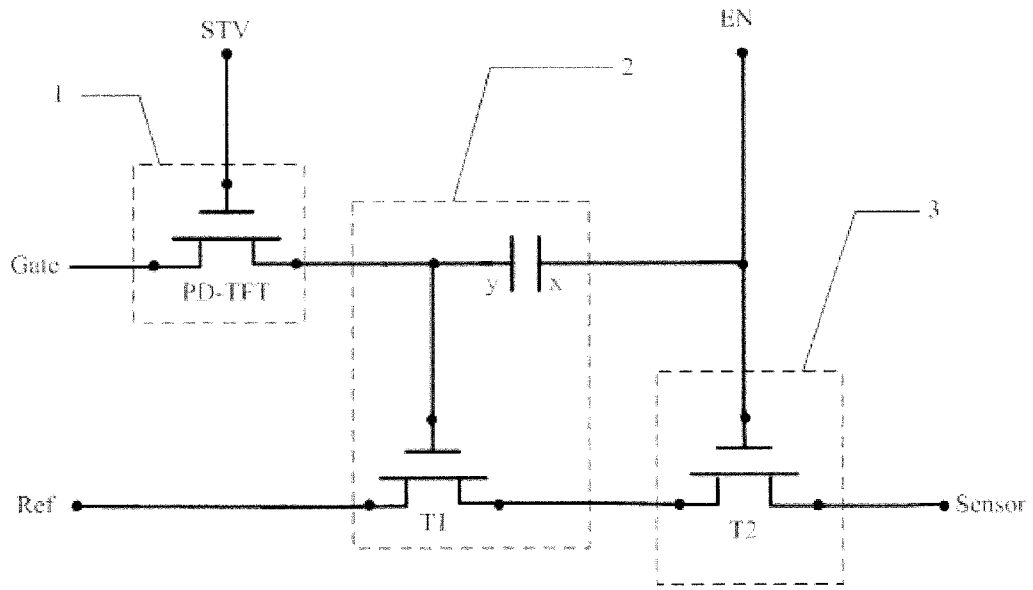
FIG. 3a-FIG. 3d are exemplary views illustrating detailed structures of the touch driving circuit according to the embodiments of the present disclosure.
Figure 3B:
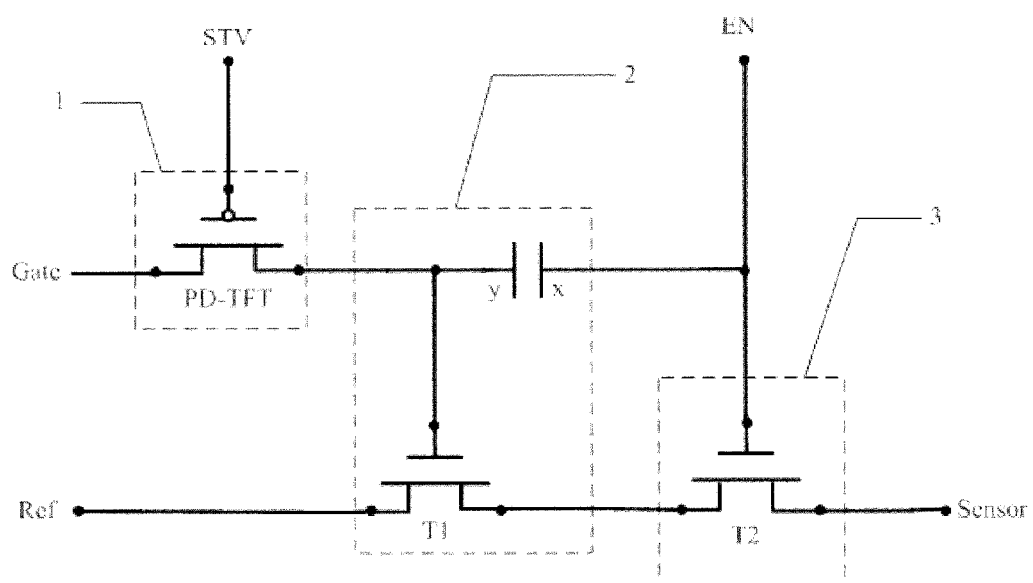
Figure 3C:
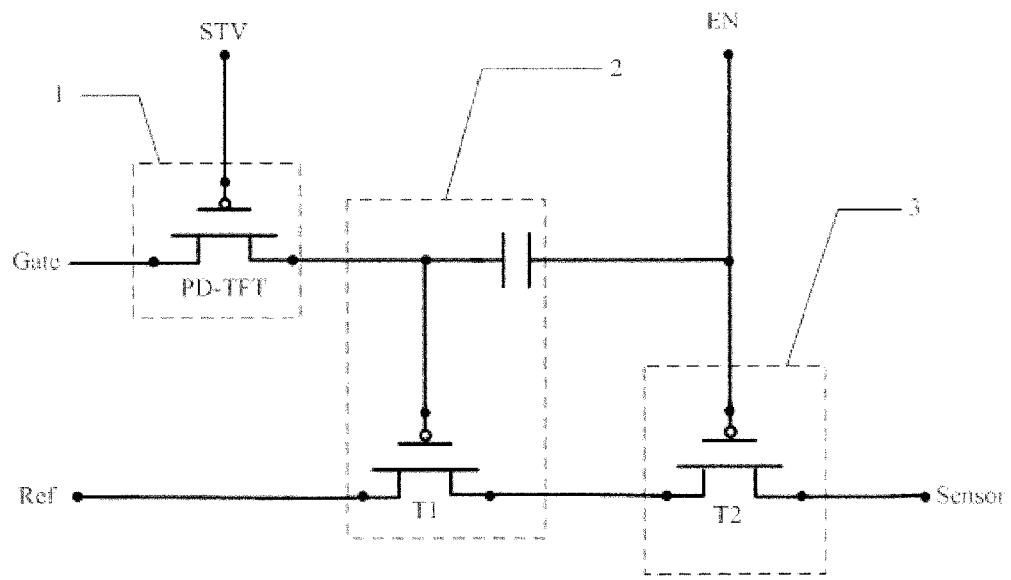
Figure 3D:
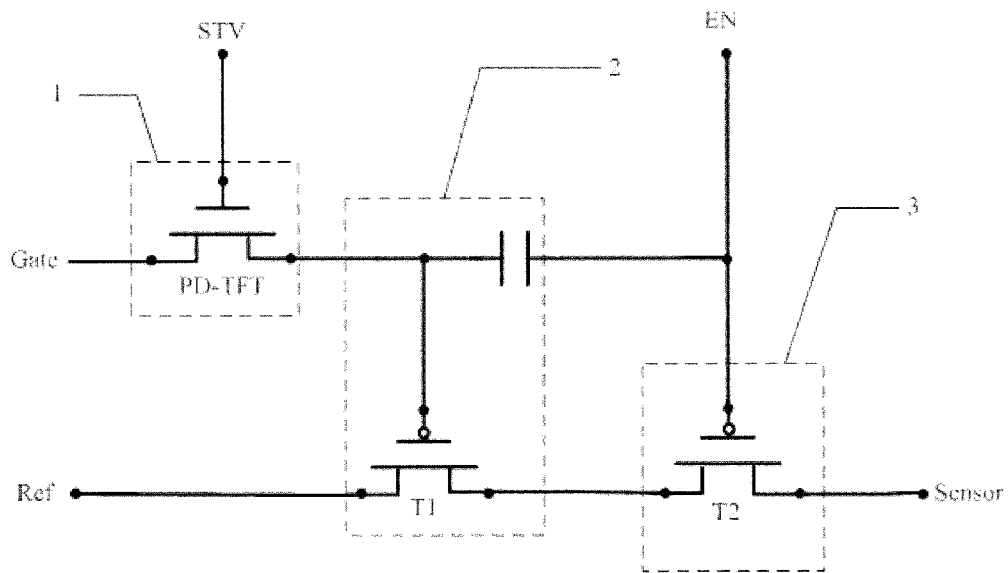

For example, in an exemplary embodiment, the photosensitive transistor PD-TFT can be an N-type transistor, as illustrated in FIG. 3a and FIG. 3d. Alternatively, the photosensitive transistor PD-TFT can also be a P-type transistor, as illustrated in FIG. 3b and FIG. 3c. The type of the photosensitive transistor PD-TFT is not limited thereto. In a case in which the photosensitive transistor PD-TFT is the N-type transistor, it would be in a turn-on state when a signal at the switch signal terminal STV is a high level signal; and in a case in which the photosensitive transistor PD-TFT is the P-type transistor, it would be in the turn-on state when the signal at the switch signal terminal STV is a low level signal.

It should be noted that the photosensitive transistor PD-TFT would be in the turn-on state as long as the light irradiates on the photosensitive transistor PD-TFT no matter whether a high level or low level at which the gate of the photosensitive transistor PD-TFT is.

The touch signal outputted to the driving sub-module 2 from the photosensitive transistor PD-TFT depends on the intensity of light irradiated on the photosensitive transistor PD-TFT, when the photosensitive transistor PD-TFT is in turn-on state due to irradiation of light. In a case in which the photosensitive transistor PD-TFT is the N-type transistor, the greater the intensity of light is, the smaller the touch signal is; and in a case in which the photosensitive transistor PD-TFT is the P-type transistor, the greater the intensity of light is, the larger the touch signal is.

For example, in an exemplary embodiment, in the touch driving circuit according to the embodiments of the present disclosure, as illustrated in FIG. 3a-FIG. 3d, the driving sub-module 2 can comprise a capacitor Cst and a driving transistor T1; wherein, a first terminal x of the capacitor Cst is connected with the control signal terminal EN, and a second terminal y of the capacitor Cst is connected with a gate of the driving transistor T1 and the signal output terminal of the photosensitive sub-module 1, respectively;

a source of the driving transistor T1 is connected with the reference signal terminal Ref, and a drain of the driving transistor T1 is connected with the second signal input terminal of the controlling sub-module 3.

In a further embodiment, a signal of the reference signal terminal Ref is a constant voltage signal in general and particularly can be a power supply signal. Thus, the touch sensing signal outputted from the drain of the driving transistor T1 only has a relation with the touch signal outputted to the gate of the driving transistor T1 from the photosensitive sub-module 1 since a voltage inputted to the source of the driving transistor T1 has a constant value, and the touch signal outputted to the gate of the driving transistor T1 from the photosensitive sub-module 1 in turn has a relation with the intensity of light irradiated on the photosensitive sub-module 1; therefore the greater the intensity of light irradiated on the photosensitive sub-module 1 is, the smaller the touch sensing signal outputted from the drain of the driving transistor T1 is.

Further, in an exemplary embodiment, as illustrated in FIG. 3a-FIG. 3d, the controlling sub-module 3 in the touch driving circuit according to the embodiments of the present disclosure can comprise a switch transistor T2; wherein a gate of the switch transistor T2 is connected with the control signal terminal EN, a source of the switch transistor T2 is connected with the drain of the driving transistor T1, and a drain of the switch transistor T2 is connected with the touch signal reading terminal Sensor.

It should be noted that, as being implemented in practice, the switch transistor T2 can be an N-type transistor, or can also be a P-type transistor, and the type of the switch transistor T2 is not limited thereto. In a case in which the switch transistor T2 is the N-type transistor, it would be in a turn-on state when a signal at the control signal terminal EN is at a high level; and in a case in which the switch transistor T2 is the P-type transistor, it would be in the turn-on state when the signal at the control signal terminal EN is at a low level.

Further, in the touch driving circuit according to the embodiments of the present disclosure, the controlling sub-module 3 is utilized to control the driving sub-module 2 so as to output the touch sensing signal to the touch signal reading terminal Sensor, that is, the touch sensing signal outputted from the driving sub-module 2 can be outputted to the touch signal reading terminal Sensor via the switch transistor T2 only when the switch transistor T2 is in the turn-on state; while the switch transistor T2 is in a turn-off state, no signal is outputted to the touch signal reading terminal Sensor. Thus, in a multi-stage of driving circuits comprising a plurality of the above touch driving circuits, in a case in which the touch signal reading terminals of the respective stages of the driving circuits are connected to a same touch signal reading line, a controlling sub-module of one stage of the driving circuit is switched on while the controlling sub-modules of the remaining stages of the driving circuits are switched off, and only the touch signal reading terminal of this stage of the driving circuit outputs a signal and would not be affected by outputting signals from other stages of the driving circuits, so that the crosstalk can be prevented from occurring in the signals outputted from the touch signal reading terminals of the different stages of the driving circuits, which can improve the accuracy of the detection of touch signals without increasing the wiring area on the touch panel.

In an example, both the driving transistor T1 and the switch transistor T2 can be the N-type transistors. Alternatively, both of them can be the P-type transistors. The types of them are not limited thereto. In a case in which both the driving transistor T1 and the switch transistor T2 are the N-type transistors, the switch transistor T2 would be in the turn-on state only when the signal at the control signal terminal EN is at a high level, and the driving transistor T1 would be in the turn-on state only when a voltage at the gate of the driving transistor T1 is at a high level. In a case in which both the driving transistor T1 and the switch transistor T2 are the P-type transistors, the switch transistor T2 would be in the turn-on state only when the signal at the control signal terminal EN is at the low level, and the driving transistor T1 would be in the turn-on state only when a voltage at the gate of the driving transistor T1 is at the low level.

It should be noted that the driving transistor and the switch transistor mentioned in the touch driving circuit according to the embodiments of the present disclosure can be Thin Film Transistors (TFTs) or can also be Metal Oxide Semiconductor Field Effect Transistors (MOSFETs), and no limitation is made herein. Further, because a source and a drain of the switch transistor utilized herein are symmetrical, the source and the drain can be exchanged. In the embodiments of the present disclosure, in order to distinguish two electrodes other than a gate of the transistor, one electrode therein is referred to as the source while the other electrode is referred to as the drain. If the source acts as a signal input terminal, the drain acts as a signal output terminal, and vice versa.

Thereafter, the particular operational principles of the touch driving circuit according to the embodiments of the present disclosure would be described in detail by means of several specific examples. In the examples, in particular, the photosensitive sub-module 1 comprises the photosensitive transistor PD-TFT, the driving sub-module 2 comprises the driving transistor T1 and the capacitor Cst, the controlling sub-module 3 comprises the switch transistor T2; and the signal at the reference signal terminal Ref is a constant voltage signal $V_{DD}$ at a high level.

Embodiment 1

Figure 4A:
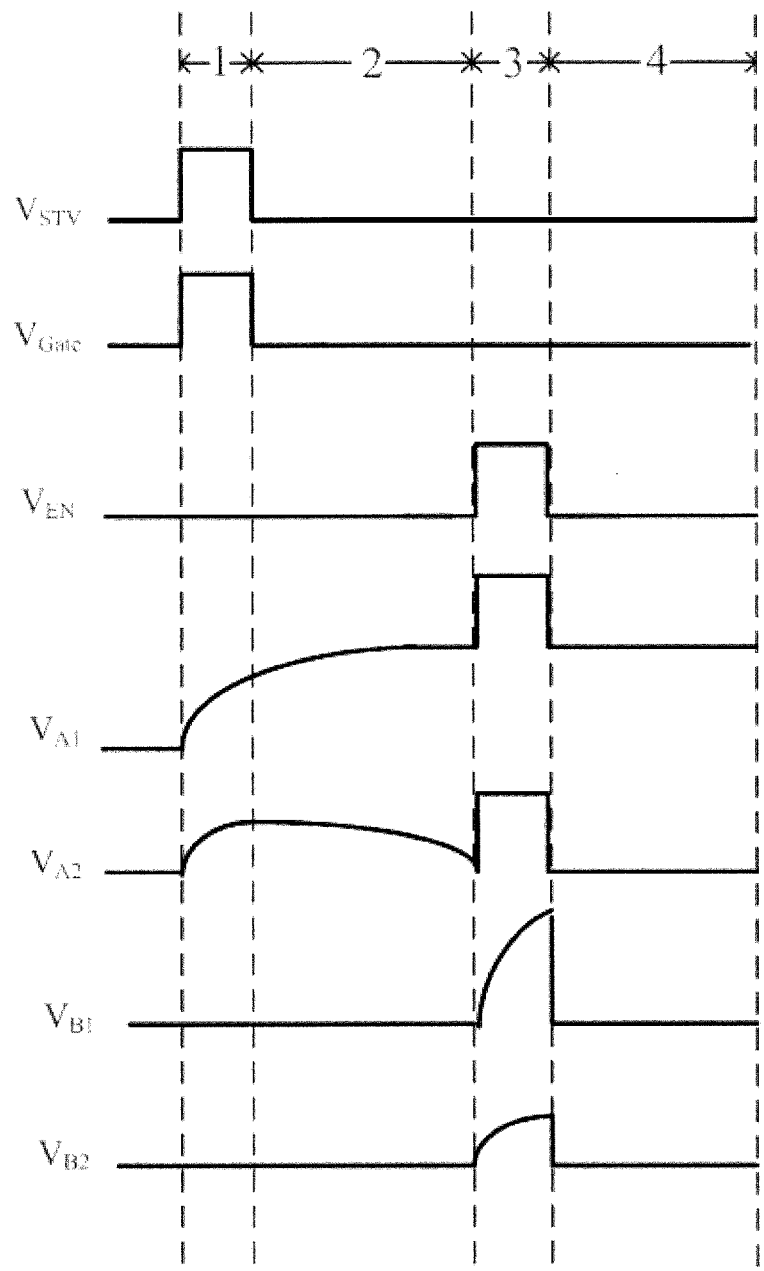
FIG. 4a-FIG. 4d are circuit timing diagrams of the touch driving circuit according to the embodiments of the present disclosure.

As illustrated in FIG. 3a, the photosensitive transistor PD-TFT, the driving transistor T1 and the switch transistor T2 are all the N-type transistors. FIG. 4a is a timing diagram of the circuit shown in FIG. 3a, wherein, in FIG. 4a, a voltage at the switch signal terminal is $V_{STV}$, a voltage at the gate signal terminal is $V_{Gate}$, a voltage at the control signal terminal is $V_{EN}$, the gate of the driving transistor T1 has a voltage of $V_{A1}$ as a touch occurs while has a voltage of $V_{A2}$ as no touch occurs, and the touch signal reading terminal Sensor has a voltage of $V_{B1}$ as a touch occurs while has a voltage of $V_{B2}$ as no touch occurs.

Particularly, the operational principle of the touch driving circuit is as follows.

A first phase 1: the voltage $V_{STV}$ at the switch signal terminal and the voltage $V_{Gate}$ at the gate signal terminal are at the high level at the same time, the photosensitive transistor PD-TFT is in the turn-on state; the voltage $V_{EN}$ at the control signal terminal is at the low level, and the switch transistor T2 is in the turn-off state. During this phase, the voltage $V_{Gate}$ at the gate signal terminal would be transferred to the gate of the driving transistor T1 through the photosensitive transistor PD-TFT which is turned on no matter whether a touch occurs on the photosensitive transistor PD-TFT or not, that is, no matter whether the external light irradiates on the photosensitive transistor PD-TFT or not, and the voltage at the gate of the driving transistor T1 can rise gradually due to the effect of the capacitor Cst, such that the driving transistor T1 is turned on gradually and the voltage $V_{DD}$ at the reference signal terminal is transferred to the source of the switch transistor T2 through the driving transistor T1 which is turned on. However, no touch sensing signal is outputted from the touch signal reading terminal Sensor since the switch transistor T2 is in the turn-off state.

A second phase 2: all of the voltage $V_{STV}$ at the switch signal terminal, the voltage $V_{Gate}$ at the gate signal terminal and the voltage $V_{EN}$ at the control signal terminal are at the low level, the switch transistor T2 is in the turn-off state, and no touch sensing signal is outputted from the touch signal reading terminal Sensor.

When no light irradiates on the photosensitive transistor PD-TFT, that is, when a touch occurs: at this time, the photosensitive transistor PD-TFT would be in the turn-off state since the voltage $V_{STV}$ at the switch signal terminal is at the low level, the gate voltage $V_{A1}$ of the driving transistor T1 can be maintained at a high potential, and the driving transistor T1 is in the turn-on state all the time.

When light irradiates on the photosensitive transistor PD-TFT, that is, when no touch occurs: at this time, although the voltage $V_{STV}$ at the switch signal terminal is at the low level, photon-generated carriers can be generated in an active layer of the photosensitive transistor PD-TFT under a function of a photoelectric effect and form a photocurrent, which can cause the photosensitive transistor PD-TFT to be in the turn-on state; further, the voltage $V_{Gate}$ at the gate signal terminal is at the low level, therefore the gate voltage $V_{A2}$ of the driving transistor T1 can be outputted to the gate signal terminal Gate via the photosensitive transistor PD-TFT, so that the gate voltage $V_{A2}$ of the driving transistor T1 can be reduced gradually, and thus the touch sensing signal outputted from the drain of the driving transistor T1 is in turn smaller and smaller, which results in the driving transistor T1 entering into the turn-off state gradually; wherein, the greater the intensity of light irradiated on the photosensitive transistor PD-TFT is, the smaller the voltage at the gate of the driving transistor T1 is.

A third phase 3: both of the voltage $V_{STV}$ at the switch signal terminal and the voltage $V_{Gate}$ at the gate signal terminal are at the low level, the voltage $V_{EN}$ at the control signal terminal is at the high level, and the switch transistor T2 is in the turn-on state.

When no light irradiates on the photosensitive transistor PD-TFT, that is, when a touch occurs: at this time, the voltage $V_{EN}$ at a high level at the control signal terminal can be applied to the gate of the driving transistor T1 through the capacitor Cst, so that the gate voltage $V_{A1}$ of the driving transistor T1 rises continually on the previous basis, and the driving transistor T1 continues to be in the turn-on state. The touch sensing signal outputted from the driving transistor T1 is inputted to the touch signal reading terminal Sensor via the switch transistor T2. The greater the gate voltage of the driving transistor T1 is, the greater the touch sensing signal outputted to the touch signal reading terminal Sensor is.

When light irradiates on the photosensitive transistor PD-TFT, that is, when no touch occurs: at this time, the voltage $V_{EN}$ at a high level at the control signal terminal can be applied to the gate of the driving transistor T1 through the capacitor Cst, such that the gate voltage $V_{A2}$ of the driving transistor T1 rises gradually on the previous basis. In the second phase, the gate voltage of the driving transistor T1 drops gradually due to the function of the photoelectric effect of the photosensitive transistor PD-TFT, and then the driving transistor T1 enters into the turn-off state gradually in the second phase; whereas in this third phase, the gradual rising of the gate voltage of the driving transistor T1 causes the driving transistor T1 to enter into the turn-on state gradually. The driving transistor T1 which is turned on outputs the touch sensing signal to the switch transistor T2, and the switch transistor T2 inputs the touch sensing signal to the touch signal reading terminal Sensor. The greater the intensity of light irradiated on the photosensitive transistor PD-TFT is, the smaller the voltage at the gate of the driving transistor T1 is, and thus the smaller the touch sensing signal is.

A fourth phase 4: the voltage $V_{STV}$ at the switch signal terminal, the voltage $V_{Gate}$ at the gate signal terminal and the voltage $V_{EN}$ at the control signal terminal are all at the low level, the switch transistor T2 is in the turn-off state, and the outputting of the touch sensing signal to the touch signal reading terminal Sensor is stopped as the switch transistor T2 is turned off.

Summarily, in the above touch driving circuit, the touch sensing signal outputted from the touch signal reading terminal Sensor as a touch occurs is greater than the touch sensing signal outputted from the touch signal reading terminal as no touch occurs, and it can be determined whether or not a touch occurs on the touch panel by analyzing the magnitude of the touch sensing signal outputted from the touch driving circuit, and in turn it can be determined a position of a touch point, so that the function of the touch driving is realized.

Embodiment 2

Figure 4B:
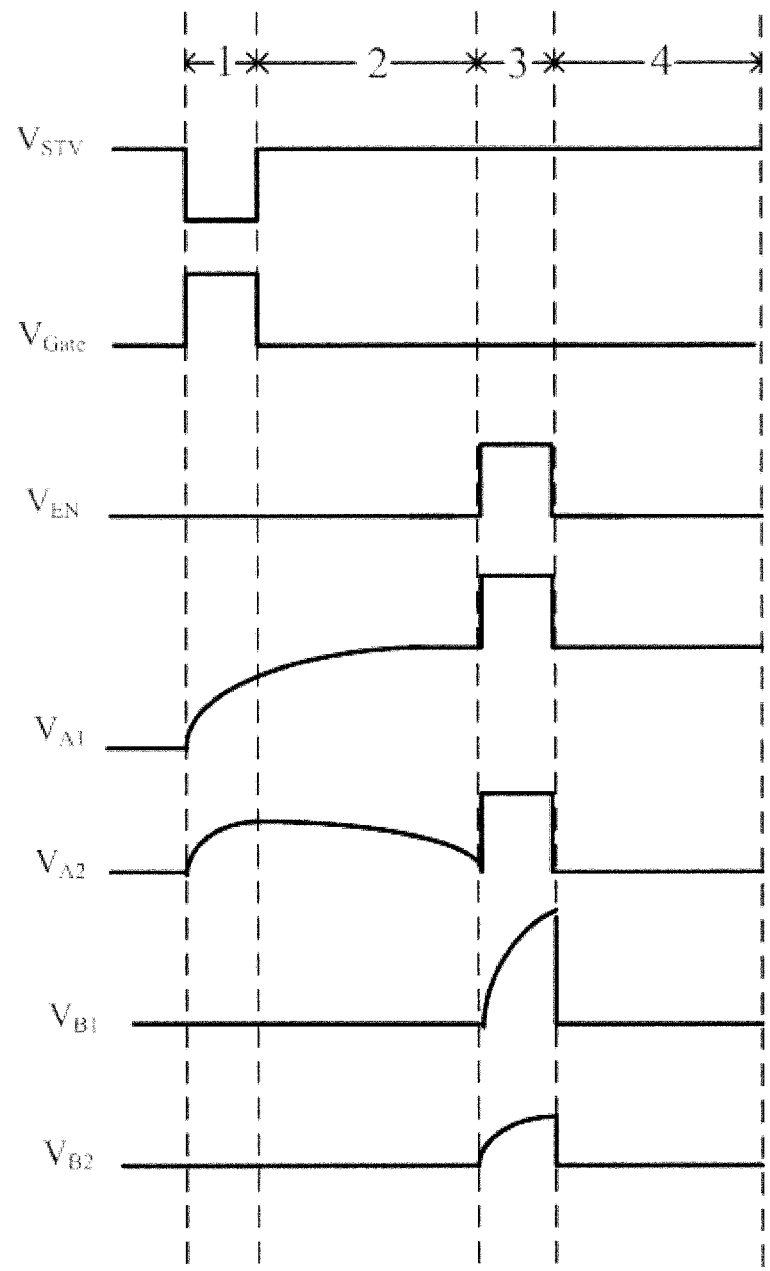

As illustrated in FIG. 3b, the photosensitive transistor PD-TFT is the P-type transistor, both of the driving transistor T1 and the switch transistor T2 are the N-type transistors. FIG. 4b is a timing diagram of FIG. 3b, wherein, in FIG. 4b, a voltage at the switch signal terminal is $V_{STV}$, a voltage at the gate signal terminal is $V_{Gate}$, a voltage at the control signal terminal is $V_{EN}$, the gate of the driving transistor T1 has a voltage of $V_{A1}$ as a touch occurs while has a voltage of $V_{A2}$ as no touch occurs, and the touch signal reading terminal Sensor has a voltage of $V_{B1}$ as a touch occurs while has a voltage of $V_{B2}$ as no touch occurs.

Particularly, the operational principle of the touch driving circuit is as follows.

A first phase 1: the voltage $V_{Gate}$ at the gate signal terminal is at the high level, the voltage $V_{STV}$ at the switch signal terminal and the voltage $V_{EN}$ at the control signal terminal are at the low level, the photosensitive transistor PD-TFT is in the turn-on state, and the switch transistor T2 is in the turn-off state. During this phase, the voltage at the gate signal terminal would be transferred to the gate of the driving transistor T1 through the photosensitive transistor PD-TFT which is turned on no matter whether a touch occurs on the photosensitive transistor PD-TFT or not, that is, no matter whether external light irradiates on the photosensitive transistor PD-TFT or not, and the voltage at the gate of the driving transistor T1 can rise gradually due to the effect of the capacitor Cst, such that the driving transistor T1 is turned on gradually and the voltage $V_{DD}$ at the reference signal terminal is transferred to the source of the switch transistor T2 through the driving transistor T1 which is turned on. However, no touch sensing signal is outputted from the touch signal reading terminal Sensor since the switch transistor T2 is in the turn-off state.

A second phase 2: the voltage $V_{STV}$ at the switch signal terminal is at the high level, both of the voltage $V_{Gate}$ at the gate signal terminal and the voltage $V_{EN}$ at the control signal terminal are at the low level, the switch transistor T2 is in the turn-off state, and no touch sensing signal is outputted from the touch signal reading terminal Sensor.

When no light irradiates on the photosensitive transistor PD-TFT, that is, when a touch occurs: at this time, the photosensitive transistor PD-TFT would be in the turn-off state since the voltage $V_{STV}$ at the switch signal terminal is at the high level, the gate voltage $V_{A1}$ of the driving transistor T1 can be kept at a high potential, and the driving transistor T1 is in the turn-on state all the time.

When light irradiates on the photosensitive transistor PD-TFT, that is, when no touch occurs: at this time, although the voltage $V_{STV}$ at the switch signal terminal is at the high level, photon-generated carriers can be generated in an active layer of the photosensitive transistor PD-TFT under a function of a photoelectric effect and form a photocurrent, which can cause the photosensitive transistor PD-TFT to be in the turn-on state, and the voltage $V_{Gate}$ at the gate signal terminal is at the low level; therefore the gate voltage $V_{A2}$ of the driving transistor T1 can be outputted to the gate signal terminal Gate via the photosensitive transistor PD-TFT, so that the gate voltage $V_{A2}$ of the driving transistor T1 can drop gradually, and thus the touch sensing signal outputted from the drain of the driving transistor T1 is in turn smaller and smaller, which results in the driving transistor T1 entering into the turn-off state gradually; wherein, the greater the intensity of light irradiated on the photosensitive transistor PD-TFT is, the smaller the voltage at the gate of the driving transistor T1 is.

A third phase 3: the voltage $V_{Gate}$ at the gate signal terminal is at the low level, the voltage $V_{STV}$ at the switch signal terminal and the voltage $V_{EN}$ at the control signal terminal are at the high level, and the switch transistor T2 is in the turn-on state.

When no light irradiates on the photosensitive transistor PD-TFT, that is, when a touch occurs: at this time, the voltage $V_{EN}$ at a high level at the control signal terminal can be applied to the gate of the driving transistor T1 through the capacitor Cst and causes the gate voltage $V_{A1}$ of the driving transistor T1 to rise continually on the previous basis, and the driving transistor T1 continues to be in the turn-on state. The touch sensing signal outputted from the driving transistor T1 is inputted to the touch signal reading terminal Sensor via the switch transistor T2. The greater the gate voltage of the driving transistor T1 is, the greater the touch sensing signal outputted to the touch signal reading terminal Sensor is.

When light irradiates on the photosensitive transistor PD-TFT, that is, when no touch occurs: at this time, the voltage $V_{EN}$ at a high level at the control signal terminal can be applied to the gate of the driving transistor T1 through the capacitor Cst, such that the gate voltage $V_{A2}$ of the driving transistor T1 rises gradually on the previous basis. In the second phase, the gate voltage of the driving transistor T1 drops gradually due to the function of the photoelectric effect of the photosensitive transistor PD-TFT, and then the driving transistor T1 enters into the turn-off state gradually in the second phase; whereas in this third phase, the gradual rising of the gate voltage of the driving transistor T1 causes the driving transistor T1 to enter the turn-on state gradually. The driving transistor T1 which is turned on outputs the touch sensing signal to the switch transistor T2, and the switch transistor T2 inputs the touch sensing signal to the touch signal reading terminal Sensor. The greater the intensity of light irradiated on the photosensitive transistor PD-TFT is, the smaller the voltage at the gate of the driving transistor T1 is, and thus the smaller the touch sensing signal is.

A fourth phase 4: the voltage $V_{STV}$ at the switch signal terminal is at the high level, both of the voltage $V_{Gate}$ at the gate signal terminal and the voltage $V_{EN}$ at the control signal terminal are at the low level, the switch transistor T2 is in the turn-off state, and the outputting of the touch sensing signal to the touch signal reading terminal Sensor is stopped as the switch transistor T2 is turned off.

Summarily, in the above touch driving circuit, the touch sensing signal outputted from the touch signal reading terminal Sensor as a touch occurs is greater than the touch sensing signal outputted from the touch signal reading terminal as no touch occurs, and it can be determined whether or not a touch occurs on the touch panel by analyzing the magnitude of the touch sensing signal outputted from the touch driving circuit, and in turn it can be determined a position of a touch point, so that the function of the touch driving is realized.

Embodiment 3

Figure 4C:
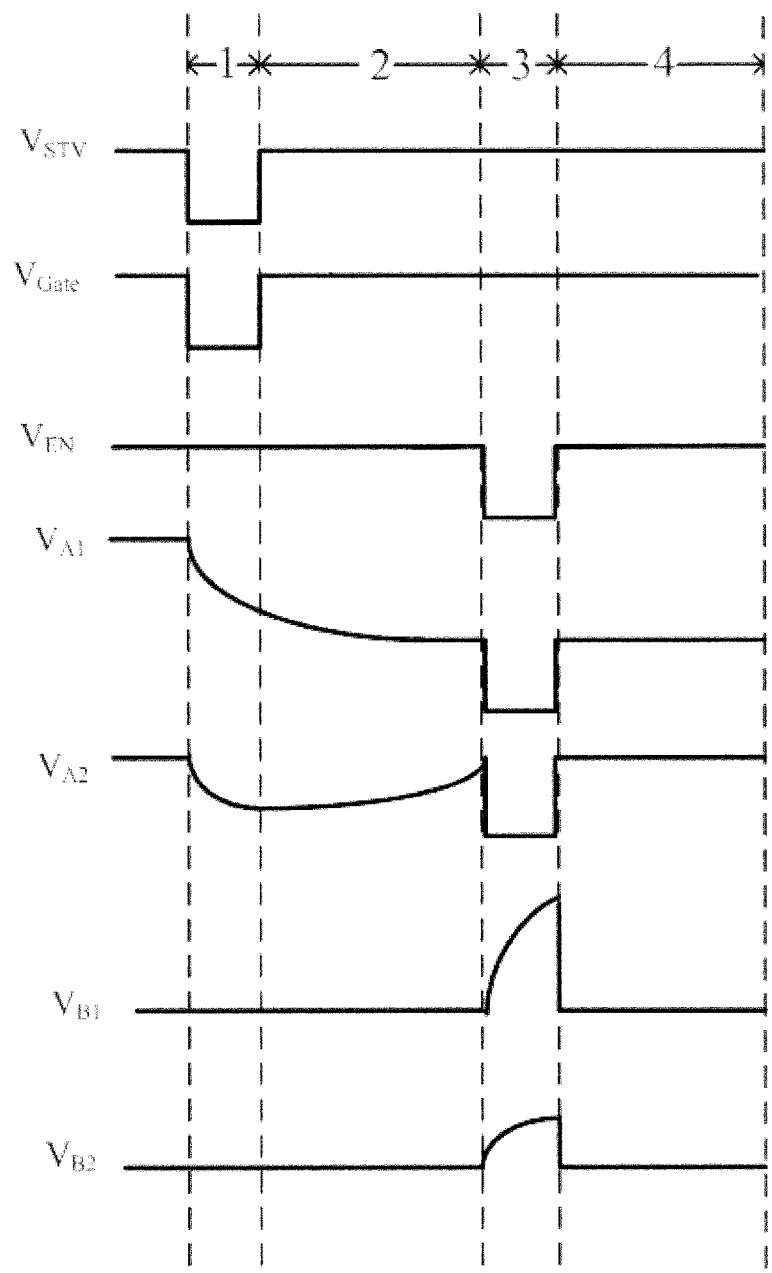

As illustrated in FIG. 3c, the photosensitive transistor PD-TFT, the driving transistor T1 and the switch transistor T2 are all the P-type transistors. FIG. 4c is a timing diagram of the circuit shown in FIG. 3c, wherein, in FIG. 4c, a voltage at the switch signal terminal is $V_{STV}$, a voltage at the gate signal terminal is $V_{Gate}$, a voltage at the control signal terminal is $V_{EN}$, the gate of the driving transistor T1 has a voltage of $V_{A1}$ as a touch occurs while has a voltage of $V_{A2}$ as no touch occurs, and the touch signal reading terminal Sensor has a voltage of $V_{B1}$ as a touch occurs while has a voltage of $V_{B2}$ as no touch occurs.

Particularly, the operational principle of the touch driving circuit is as follows.

A first phase 1: the voltage $V_{STV}$ at the switch signal terminal and the voltage $V_{Gate}$ at the gate signal terminal are at the low level at the same time, the photosensitive transistor PD-TFT is in the turn-on state; the voltage $V_{EN}$ at the control signal terminal is at the high level, and the switch transistor T2 is in the turn-off state. During this phase, the voltage at the gate signal terminal would be transferred to the gate of the driving transistor T1 through the photosensitive transistor PD-TFT which is turned on no matter whether a touch occurs on the photosensitive transistor PD-TFT or not, that is, no matter whether the external light irradiates on the photosensitive transistor PD-TFT or not, and the voltage at the gate of the driving transistor T1 can drop gradually due to the effect of the capacitor Cst, such that the driving transistor T1 is turned on gradually and the voltage $V_{DD}$ at the reference signal terminal is transferred to the source of the switch transistor T2 through the driving transistor T1 which is turned on. However, no touch sensing signal is outputted from the touch signal reading terminal Sensor since the switch transistor T2 is in the turn-off state.

A second phase 2: all of the voltage $V_{STV}$ at the switch signal terminal, the voltage $V_{Gate}$ at the gate signal terminal and the voltage $V_{EN}$ at the control signal terminal are at the high level, the switch transistor T2 is in the turn-off state, and no touch sensing signal is outputted from the touch signal reading terminal Sensor.

When no light irradiates on the photosensitive transistor PD-TFT, that is, when a touch occurs: at this time, the photosensitive transistor PD-TFT would be in the turn-off state since the voltage $V_{STV}$ at the switch signal terminal is at the high level, the gate voltage $V_{A1}$ of the driving transistor T1 can be kept at a low potential, and the driving transistor T1 is in the turn-on state all the time.

When light irradiates on the photosensitive transistor PD-TFT, that is, when no touch occurs: at this time, although the voltage $V_{STV}$ at the switch signal terminal is at the high level, photon-generated carriers can be generated in an active layer of the photosensitive transistor PD-TFT under a function of a photoelectric effect and form a photocurrent, which can cause the photosensitive transistor PD-TFT to be in the turn-on state, and the voltage $V_{Gate}$ at the gate signal terminal is at the high level; therefore the voltage $V_{Gate}$ at the gate signal terminal is outputted to the gate of the driving transistor T1 through the photosensitive transistor PD-TFT, so that the gate voltage $V_{A2}$ of the driving transistor T1 can rise gradually, and thus the touch sensing signal outputted from the drain of the driving transistor T1 is in turn smaller and smaller, which causes the driving transistor T1 to enter into the turn-off state gradually; wherein, the greater the intensity of light irradiated on the photosensitive transistor PD-TFT is, the higher the voltage at the gate of the driving transistor T1 is.

A third phase 3: both of the voltage $V_{STV}$ at the switch signal terminal and the voltage $V_{Gate}$ at the gate signal terminal are at the high level, the voltage $V_{EN}$ at the control signal terminal is at the low level, and the switch transistor T2 is in the turn-on state.

When no light irradiates on the photosensitive transistor PD-TFT, that is, when a touch occurs: at this time, the voltage $V_{EN}$ at a low level at the control signal terminal can be applied to the gate of the driving transistor T1 through the capacitor Cst and causes the gate voltage $V_{A1}$ of the driving transistor T1 to drop continually on the previous basis, and the driving transistor T1 continues to be in the turn-on state. The touch sensing signal outputted from the driving transistor T1 is inputted to the touch signal reading terminal Sensor via the switch transistor T2. The lower the gate voltage of the driving transistor T1 is, the greater the touch sensing signal outputted to the touch signal reading terminal Sensor is.

When light irradiates on the photosensitive transistor PD-TFT, that is, when no touch occurs: at this time, the voltage $V_{EN}$ at a low level at the control signal terminal can be applied to the gate of the driving transistor T1 through the capacitor Cst, such that the gate voltage $V_{A2}$ of the driving transistor T1 drops gradually on the previous basis. In the second phase, the gate voltage of the driving transistor T1 rises gradually due to the function of the photoelectric effect of the photosensitive transistor PD-TFT, and then the driving transistor T1 enters into the turn-off state gradually in the second phase; whereas in this third phase, the gradual dropping of the gate voltage of the driving transistor T1 causes the driving transistor T1 to enter into the turn-on state gradually. The driving transistor T1 which is turned on outputs the touch sensing signal to the switch transistor T2, and the switch transistor T2 inputs the touch sensing signal to the touch signal reading terminal Sensor. The greater the intensity of light irradiated on the photosensitive transistor PD-TFT is, the higher the voltage at the gate of the driving transistor T1 is, and thus the smaller the touch sensing signal is.

A fourth phase 4: the voltage $V_{STV}$ at the switch signal terminal, the voltage $V_{Gate}$ at the gate signal terminal and the voltage $V_{EN}$ at the control signal terminal are all at the high level, the switch transistor T2 is in the turn-off state, and the outputting of the touch sensing signal to the touch signal reading terminal Sensor is stopped as the switch transistor T2 is turned off.

Summarily, in the above touch driving circuit, a touch sensing signal outputted from the touch signal reading terminal Sensor as a touch occurs is greater than a touch sensing signal outputted from the touch signal reading terminal as no touch occurs, and it can be determined whether or not a touch occurs on the touch panel by analyzing the magnitude of the touch sensing signal outputted from the touch driving circuit, and in turn it can be determined a position of a touch point, so that the function of the touch driving is realized.

Embodiment 4

Figure 4D:
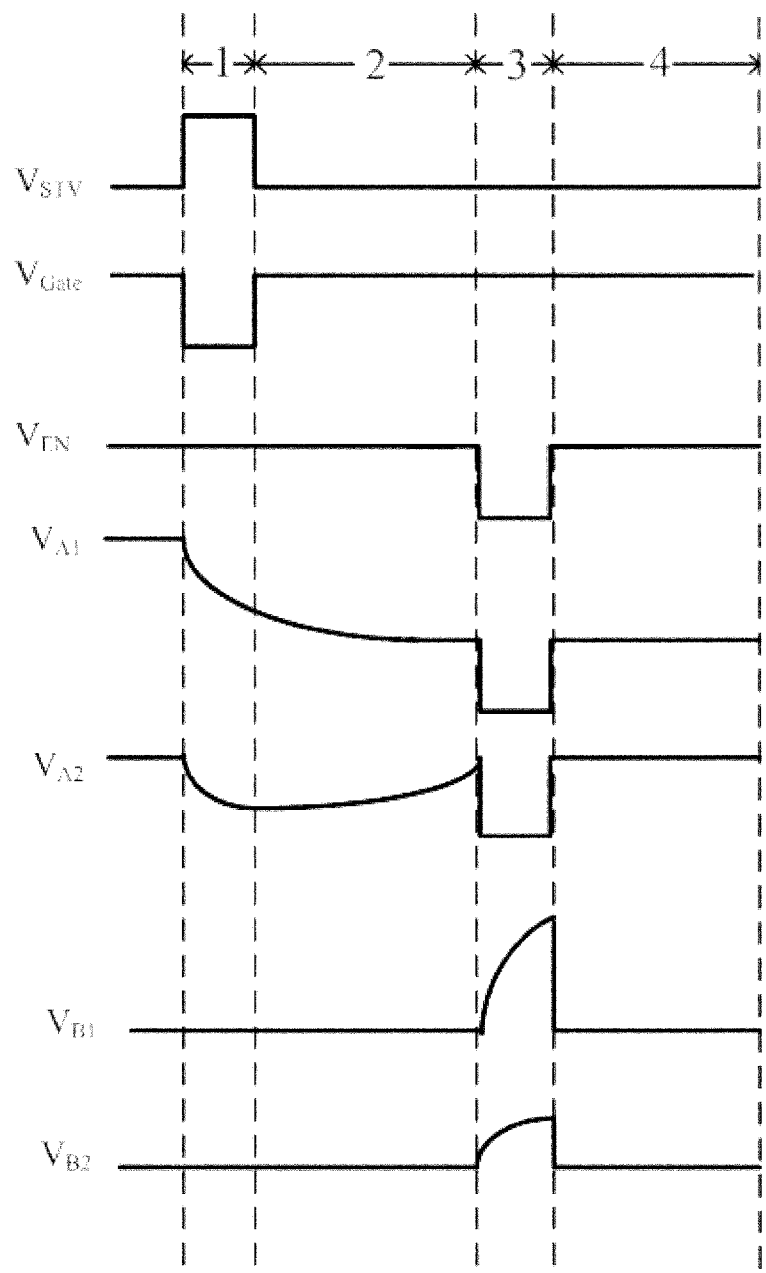

As illustrated in FIG. 3d, the photosensitive transistor PD-TFT is the N-type transistor, both of the driving transistor T1 and the switch transistor T2 are the P-type transistors. FIG. 4d is a timing diagram of the circuit shown in FIG. 3d, wherein, in FIG. 4d, a voltage at the switch signal terminal is $V_{STV}$, a voltage at the gate signal terminal is $V_{Gate}$, a voltage at the control signal terminal is $V_{EN}$, the gate of the driving transistor T1 has a voltage of $V_{A1}$ as a touch occurs while has a voltage of $V_{A2}$ as no touch occurs, and the touch signal reading terminal Sensor has a voltage of $V_{B1}$ as a touch occurs while has a voltage of $V_{B2}$ as no touch occurs.

Particularly, the operational principle of the touch driving circuit is as follows.

A first phase 1: the voltage $V_{Gate}$ at the gate signal terminal is at the low level, the voltage $V_{STV}$ at the switch signal terminal is at the high level, the photosensitive transistor PD-TFT is in the turn-on state; the voltage $V_{EN}$ at the control signal terminal is at the high level, and the switch transistor T2 is in the turn-off state. During this phase, the voltage at the gate signal terminal would be transferred to the gate of the driving transistor T1 through the photosensitive transistor PD-TFT which is turned on no matter whether a touch occurs on the photosensitive transistor PD-TFT or not, that is, no matter whether external light irradiates on the photosensitive transistor PD-TFT or not, and the voltage at the gate of the driving transistor T1 can drop gradually due to the effect of the capacitor Cst, such that the driving transistor T1 is turned on gradually, and the voltage $V_{DD}$ at the reference signal terminal is transferred to the source of the switch transistor T2 through the driving transistor T1 which is turned on. However, no touch sensing signal is outputted from the touch signal reading terminal Sensor since the switch transistor T2 is in the turn-off state.

A second phase 2: the voltage $V_{STV}$ at the switch signal terminal is at the low level, both of the voltage $V_{Gate}$ at the gate signal terminal and the voltage $V_{EN}$ at the control signal terminal are at the high level, the switch transistor T2 is in the turn-off state, and no touch sensing signal is outputted from the touch signal reading terminal Sensor.

When no light irradiates on the photosensitive transistor PD-TFT, that is, when a touch occurs: at this time, the photosensitive transistor PD-TFT would be in the turn-off state since the voltage $V_{STV}$ at the switch signal terminal is at the low level, the gate voltage $V_{A1}$ of the driving transistor T1 can be kept at a low potential, and the driving transistor T1 is in the turn-on state all the time.

When light irradiates on the photosensitive transistor PD-TFT, that is, when no touch occurs: at this time, although the voltage $V_{STV}$ at the switch signal terminal is at the low level, photon-generated carriers can be generated in an active layer of the photosensitive transistor PD-TFT under a function of a photoelectric effect and form a photocurrent, which can cause the photosensitive transistor PD-TFT to be in the turn-on state; since the voltage $V_{Gate}$ at the gate signal terminal is at the high level, the voltage $V_{Gate}$ at the gate signal terminal can be outputted to the gate of the driving transistor T1 via the photosensitive transistor PD-TFT, so that the gate voltage $V_{A2}$ of the driving transistor T1 can rise gradually, and thus the touch sensing signal outputted from the drain of the driving transistor T1 is in turn smaller and smaller, which causes the driving transistor T1 to enter into the turn-off state gradually; wherein the greater the intensity of light irradiated on the photosensitive transistor PD-TFT is, the higher the voltage at the gate of the driving transistor T1 is.

A third phase 3: the voltage $V_{Gate}$ at the gate signal terminal is at the high level, both of the voltage $V_{STV}$ at the switch signal terminal and the voltage $V_{EN}$ at the control signal terminal are at the low level, and the switch transistor T2 is in the turn-on state.

When no light irradiates on the photosensitive transistor PD-TFT, that is, when a touch occurs: at this time, the voltage $V_{EN}$ at a low level at the control signal terminal can be applied to the gate of the driving transistor T1 through the capacitor Cst and causes the gate voltage $V_{A1}$ of the driving transistor T1 to drop continually on the previous basis, and the driving transistor T1 continues to be in the turn-on state. The touch sensing signal outputted from the driving transistor T1 is inputted to the touch signal reading terminal Sensor via the switch transistor T2. The lower the gate voltage of the driving transistor T1 is, the greater the touch sensing signal outputted to the touch signal reading terminal Sensor is.

When light irradiates on the photosensitive transistor PD-TFT, that is, when no touch occurs: at this time, the voltage $V_{EN}$ at a low level at the control signal terminal can be applied to the gate of the driving transistor T1 through the capacitor Cst, such that the gate voltage $V_{A2}$ of the driving transistor T1 drops gradually on the previous basis; in the second phase, the gate voltage of the driving transistor T1 rises gradually due to the function of the photoelectric effect of the photosensitive transistor PD-TFT, and then the driving transistor T1 enters into the turn-off state gradually in the second phase; whereas in this third phase, the gradual dropping of the gate voltage of the driving transistor T1 causes the driving transistor T1 to enter into the turn-on state gradually. The driving transistor T1 which is turned on outputs the touch sensing signal to the switch transistor T2, and the switch transistor T2 inputs the touch sensing signal to the touch signal reading terminal Sensor. The greater the intensity of light irradiated on the photosensitive transistor PD-TFT is, the higher the voltage at the gate of the driving transistor T1 is, and thus the smaller the touch sensing signal is.

A fourth phase 4: the voltage $V_{STV}$ at the switch signal terminal is at the low level, both of the voltage $V_{Gate}$ at the gate signal terminal and the voltage $V_{EN}$ at the control signal terminal are at the high level, the switch transistor T2 is in the turn-off state, and the outputting of the touch sensing signal to the touch signal reading terminal Sensor is stopped as the switch transistor T2 is turned off.

Summarily, in the above touch driving circuit, the touch sensing signal outputted from the touch signal reading terminal Sensor as a touch occurs is greater than the touch sensing signal outputted from the touch signal reading terminal as no touch occurs, and it can be determined whether or not a touch occurs on the touch panel by analyzing the magnitude of the touch sensing signal outputted from the touch driving circuit, and in turn it can be determined a position of a touch point, so that the functions of the touch driving are realized.

Based on the same inventive concept, the embodiments of the present disclosure further provide an optical in cell touch panel comprising the touch driving circuit according to the embodiments of the present disclosure. Since the principle of the optical in cell touch panel for settling the problems in the prior art is similar to that of the touch driving circuit described above, implementations for the optical in cell touch panel can refer to the implementations for the touch driving circuit, and details are omitted herein.

Based on the same inventive conception, the embodiments of the present disclosure further provide a display device comprising the optical in cell touch panel according to the embodiments of the present disclosure, and the display device can be any product or element having a display function, such as a mobile phone, a tablet computer, a TV, a display, a notebook computer, a digital photo frame, a navigator, etc. Any other necessary components in the display device are well-known by those ordinary skilled in the art, therefore their details are omitted herein and are not constructed as limitations on the present disclosure.

The embodiments of the present disclosure provide a touch driving circuit, an optical in cell touch panel and a display device, and the touch driving circuit comprises: a driving sub-module, a photosensitive sub-module, and a controlling sub-module, wherein, a first signal input terminal of the photosensitive sub-module is connected with a switch signal terminal, a second signal input terminal of the photosensitive sub-module is connected with a gate signal terminal, and a signal output terminal of the photosensitive sub-module is connected with a first signal input terminal of the driving sub-module; a second signal input terminal of the driving sub-module is connected with a reference signal terminal, a third signal input terminal of the driving sub-module is connected with a control signal terminal and a first signal input terminal of the controlling sub-module, respectively; a signal output terminal of the driving sub-module is connected with a second signal input terminal of the controlling sub-module; and a signal output terminal of the controlling sub-module is connected with a touch signal reading terminal. The photosensitive sub-module outputs a touch signal to the driving sub-module under controls of the switch signal terminal and the gate signal terminal; the driving sub-module outputs a touch sensing signal to the controlling sub-module under a control of the touch signal, and the touch sensing signal decreases as an intensity of light radiated on the photosensitive sub-module increases; and the controlling sub-module outputs the touch sensing signal to the touch signal reading terminal when the control signal terminal controls the controlling sub-module to be in a turn-on state, so as to achieve the touch detection function. As compared with the driving circuit in the existing optical in cell touch panel, the touch driving circuit according to the embodiments of the present disclosure utilizes the controlling sub-module to control the driving sub-module so as to output the touch sensing signal, in a case in which the touch signal reading terminals of the respective stages of the driving circuits are connected to a same touch signal reading line, a crosstalk can be prevented from occurring in the signals outputted from the touch signal reading terminals of the different stages of the driving circuits, which can improve the accuracy of the detection of touch signals without increasing the wiring area on the touch panel.

It will be obvious that those skilled in the art may make modifications and variations to the above embodiments without departing from the spirit and scope of the present disclosure. Such variations and modifications are intended to be included within the spirit and scope of the present disclosure provided that all the modifications and variations belong to the equivalent technical solutions of the present disclosure as defined in the claims.

What is claimed is:

1. A touch driving circuit comprising a photosensitive sub-module, a driving sub-module and a controlling sub-module, wherein,
   a first signal input terminal of the photosensitive sub-module is connected with a switch signal terminal, a second signal input terminal of the photosensitive sub-module is connected with a gate signal terminal, a signal output terminal of the photosensitive sub-module is connected with a first signal input terminal of the driving sub-module; the photosensitive sub-module is configured to output a touch signal to the driving sub-module under controls of the switch signal terminal and the gate signal terminal;
   a second signal input terminal of the driving sub-module is connected with a reference signal terminal, a third signal input terminal of the driving sub-module is connected with a control signal terminal and a first signal input terminal of the controlling sub-module, respectively, a signal output terminal of the driving sub-module is connected with a second signal input terminal of the controlling sub-module; the driving sub-module is configured to output a touch sensing signal to the controlling sub-module under a control of the touch signal, the touch sensing signal decreasing as an intensity of light irradiated on the photosensitive sub-module increases; and
   a signal output terminal of the controlling sub-module is connected with a touch signal reading terminal; the controlling sub-module is configured to output the touch sensing signal to the touch signal reading terminal when the control signal terminal controls the controlling sub-module to be in a turn-on state,
   wherein the photosensitive sub-module further comprises a photosensitive transistor;
   wherein a gate of the photosensitive transistor is connected with the switch signal terminal, a source of the photosensitive transistor is connected with the gate signal terminal, and a drain of the photosensitive transistor is connected with the first signal input terminal of the driving sub-module.

2. The touch driving circuit of claim 1, wherein the photosensitive transistor is an N-type transistor; or the photosensitive transistor is a P-type transistor.

3. The touch driving circuit of claim 2, wherein the driving sub-module further comprises a capacitor and a driving transistor; wherein,
 a first terminal of the capacitor is connected with the control signal terminal, and a second terminal of the capacitor is connected with a gate of the driving transistor and the signal output terminal of the photosensitive sub-module, respectively; and
 a source of the driving transistor is connected with the reference signal terminal, and a drain of the driving transistor is connected with the second signal input terminal of the controlling sub-module.

4. The touch driving circuit of claim 3, wherein the controlling sub-module further comprises a switch transistor; wherein
 a gate of the switch transistor is connected with the control signal terminal, a source of the switch transistor is connected with the drain of the driving transistor, and a drain of the switch transistor is connected with the touch signal reading terminal.

5. The touch driving circuit of claim 4, wherein the driving transistor and the switch transistor are N-type transistors; or
 the driving transistor and the switch transistor are P-type transistors.

6. An optical in cell touch panel comprising the touch driving circuit of claim 1.

7. A display device comprising the optical in cell touch panel of claim 6.

8. The optical in cell touch panel of claim 6, wherein the photosensitive transistor is an N-type transistor; or the photosensitive transistor is a P-type transistor.

9. The optical in cell touch panel of claim 8, wherein the driving sub-module further comprises a capacitor and a driving transistor; wherein,
 a first terminal of the capacitor is connected with the control signal terminal, and a second terminal of the capacitor is connected with a gate of the driving transistor and the signal output terminal of the photosensitive sub-module, respectively; and
 a source of the driving transistor is connected with the reference signal terminal, and a drain of the driving transistor is connected with the second signal input terminal of the controlling sub-module.

10. The optical in cell touch panel of claim 9, wherein the controlling sub-module further comprises a switch transistor; wherein
 a gate of the switch transistor is connected with the control signal terminal, a source of the switch transistor is connected with the drain of the driving transistor, and a drain of the switch transistor is connected with the touch signal reading terminal.

11. The optical in cell touch panel of claim 10, wherein the driving transistor and the switch transistor are N-type transistors; or
 the driving transistor and the switch transistor are P-type transistors.

12. The display device of claim 7, wherein the photosensitive transistor is an N-type transistor; or the photosensitive transistor is a P-type transistor.

13. The display device of claim 12, wherein the driving sub-module further comprises a capacitor and a driving transistor; wherein,
 a first terminal of the capacitor is connected with the control signal terminal, and a second terminal of the capacitor is connected with a gate of the driving transistor and the signal output terminal of the photosensitive sub-module, respectively; and
 a source of the driving transistor is connected with the reference signal terminal, and a drain of the driving transistor is connected with the second signal input terminal of the controlling sub-module.

14. The display device of claim 13, wherein the controlling sub-module further comprises a switch transistor; wherein
 a gate of the switch transistor is connected with the control signal terminal, a source of the switch transistor is connected with the drain of the driving transistor, and a drain of the switch transistor is connected with the touch signal reading terminal.

15. The display device of claim 14, wherein the driving transistor and the switch transistor are N-type transistors; or
 the driving transistor and the switch transistor are P-type transistors.

* * * * *